United States Patent

[11] 3,623,089

| [72] | Inventor | Lewis H. Bossert<br>El Cajon, Calif. |
|---|---|---|
| [21] | Appl. No. | 864,720 |
| [22] | Filed | Oct. 8, 1969 |
| [45] | Patented | Nov. 23, 1971 |
| [73] | Assignee | The United States of America as represented by the Secretary of the Navy |

[54] MEANS FOR INTEGRATING SUCCESSIVE RADAR VIDEO SIGNALS IN A COMPUTER
3 Claims, 3 Drawing Figs.

[52] U.S. Cl. .................................................. 343/5 DP,
325/473, 328/165
[51] Int. Cl. ...................................................... G01s 9/02,
H04b 1/10
[50] Field of Search............................................. 343/5 DP;
340/15.5 DP; 325/473, 475, 476; 328/165

[56] References Cited
UNITED STATES PATENTS
3,315,258  4/1967  Dillard ............................ 343/5 DP
3,422,435  1/1969  Cragon et al. ................ 343/5 DP
3,437,991  4/1969  Porter, Jr. ...................... 340/15.5 DP
3,517,172  6/1970  Dillard .......................... 343/5 DP Primary Examiner—Malcolm F. Hubler
Attorneys—J. C. Warfield, G. J. Rubens, J. W. McLaren and T. L. Styner ABSTRACT: To improve the signal-to-noise ratio in a radar receiver, a succession of video signals from a fixed source at a given range and azimuth are repeatedly received, each raw signal being sampled and converted to a binary coded number or word of say seven bits, and fed into the first of a series of seven-stage shift registers. Each seven-bit word is shifted into the next register as new information is fed into the first register, the word in the last register being discarded. After each new word is inserted the contents of each register is converted back to its analog value, all analog values being then added together and applied to the display cathode-ray tube.

MEANS FOR INTEGRATING SUCCESSIVE RADAR VIDEO SIGNALS IN A COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In radio communications, sonar, and radar, the signal-to-noise ratio is improved a limited extent by selective filtering. Autocorrelation or cross-correlation by comparing point-to-point two or more signals have in some cases been helpful in recovering wanted signals. Such techniques, however, are not effective in recovering the reoccurring signals of active radar buried deep in noise.

STATEMENT OF THE OBJECTS OF THE INVENTION

An object of this invention is to provide an improved method and system of recovering reoccurring radar-type signals buried deep in noise.

SUMMARY OF THE INVENTION

The object of this invention is attained by sampling the raw video signals at frequent close-spaced intervals. The instantaneous analog voltage of the signal at the precise instant of sampling is converted to a meaningful binary number or word of a sufficient number of significant places for completely and accurately defining the amplitude of each sample. Let it be said that a seven-place binary word is adequate. For convenience, this number will be referred to throughout this specification even though the generalities of the invention must not be so limited. The seven bits are moved into a seven-stage shift register and hence into a seven-bit memory. A bank of, say, 10 shift registers and a corresponding number of memory banks are provided with logic circuits (not shown) for moving the word information successively through the shift registers and memories. Between each shift the contents of the memories are all added together. Preferably the binary numbers are each converted back to analog form before being summed. Those words which define pure random noise will add to substantially zero over long periods of time whereas those words which contain real information will add up to a substantial voltage in a reasonable integrating period.

Other objects and features of this invention will become apparent to those skilled in the art by referring to the preferred embodiment described in the following specification and shown in the accompanying drawings in which.

Figure 2:
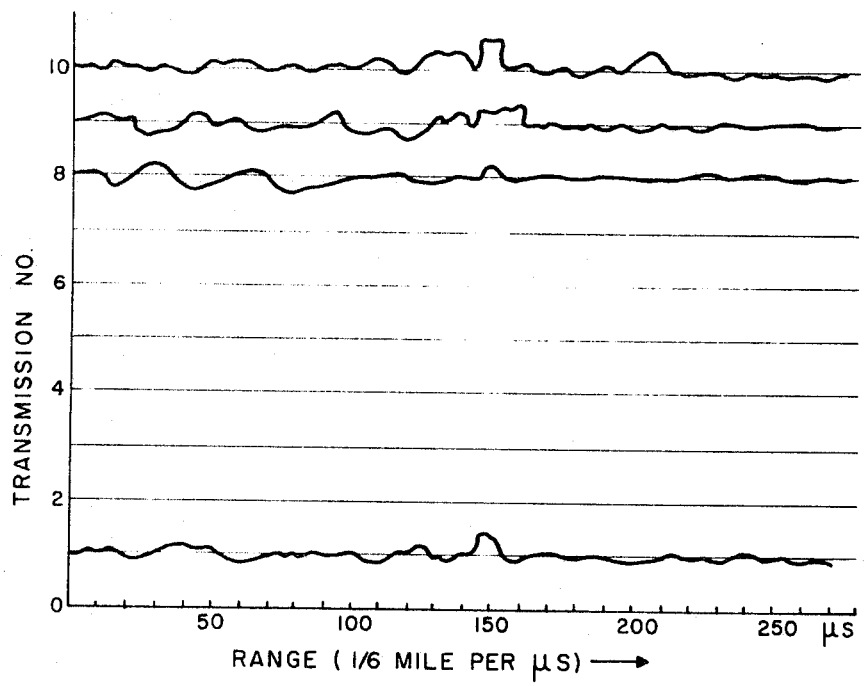
FIG. 2 is a family of signal voltage curves of the type which can be expected to occur in FIG. 1.

Let it be assumed that the radar transmitter of the system contemplated here transmits a short powerful pulse of microwave energy in a fixed given direction, and that the interval between transmissions is long enough to permit the echo from, as far away as, say, 200 miles to be received and processed before the next succeeding pulse is transmitted. For convenience, let it be assumed that 10 such pulses are transmitted at one azimuthal setting. The 10 radar video signals received and appearing at the output of the radar receiver may be such as that represented on the 10 lines of FIG. 2. Further, let it be assumed that no signals are received except a reflection from a target at a range corresponding to 150 microseconds, the remainder of each video signal comprising noise only.

Each received raw video signal is applied to the analog-to-digital converter 10. Each video signal is sampled at least once in each range bin as determined by the clock 12 which could be operating at a frequency of, say, 01 megacycle per second. Conveniently each video signal will be sampled at time intervals corresponding to range bins of one-sixth mile, inasmuch as 1 mile of radar range requires about 6 microseconds.

Each sampled voltage is converted to a digital number which number, as assumed, may comprise seven significant places, the values of which are $2^0$, $2^1$,–$2^6$. The binary bit contained in each stage of the shift register 14 is impressed upon and retained in a separate memory. Each element of the sets of banks of memories indicated at 16 may comprise magnetic cores, for example.

Between reception of successive video signals, the contents of each memory bank are reconverted to an analog voltage, in converters 22, and with other voltages is applied to the summer 18. After this read out and before the next video signal is received and converted in A-to-D converter 10, the contents of each memory bank are moved to the next succeeding shift register and its accompanying memory bank.

To reiterate, each succeeding new signal is converted, moved into the first shift register bank and its accompanying memory set, and is shifted to the next register and memory until the entire memory is filled. It may be said that all signals move serially into and through the storage banks, but the signals in the banks are read out simultaneously or in parallel.

In the case illustrated where there are 10 shift registers of seven stages for seven bits and 10 seven-bit memories, the 11th word to be inserted requires that the contents of the last memory be discarded. For this purpose the contents of the last memory bank can be fed into the dissipating resistor 19.

Figure 1:
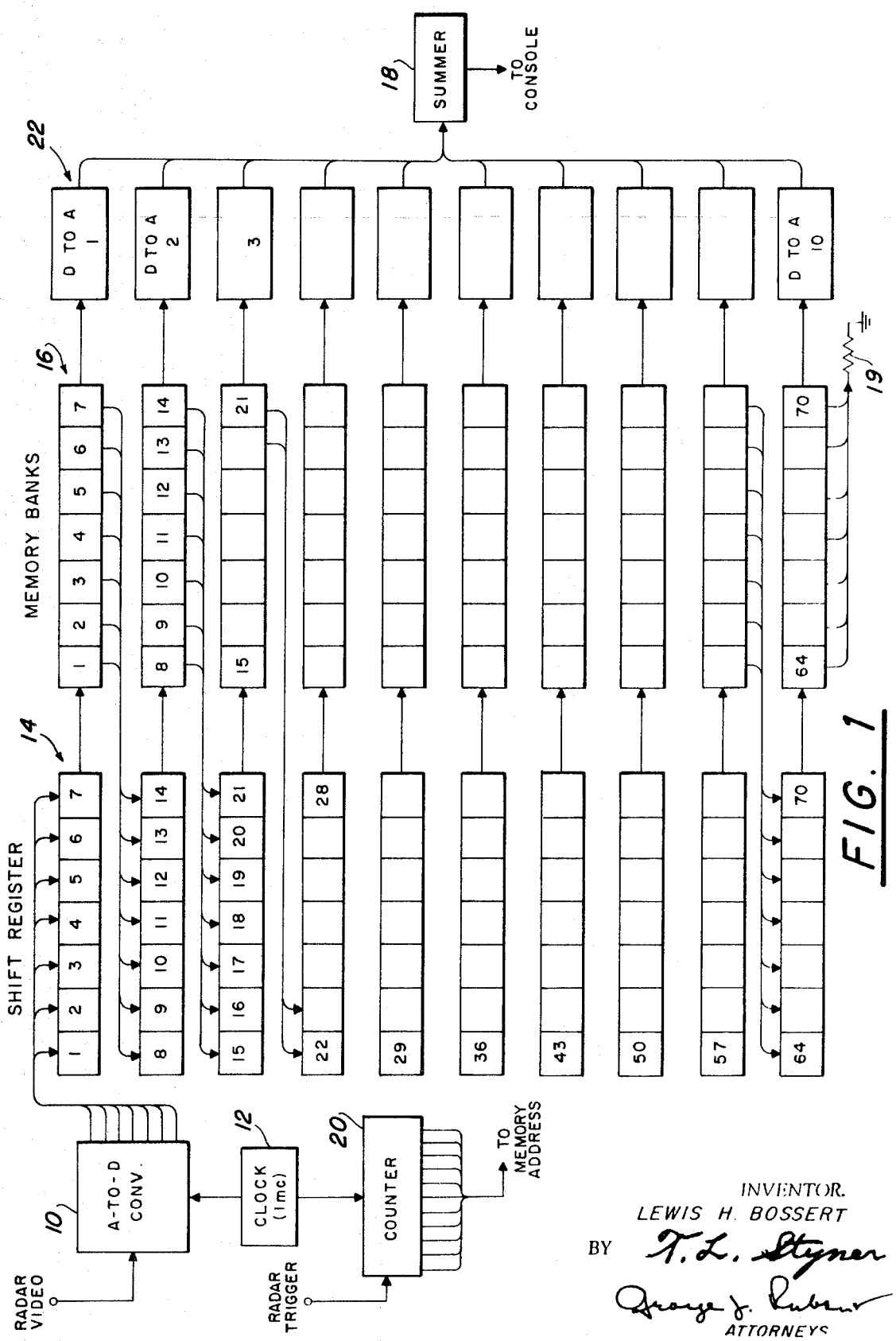
FIG. 1 is a block diagram showing the principal information elements of part of the system of this invention.

The block diagram of FIG. 1 is intended merely to illustrate the general direction of flow of information and rationale of the invention. To add logic circuits for steering and timing this flow of information would serve no useful purpose. However, the counter 20 operated by the clock 12 is shown for successively generating a switching voltage on the address lines. The counter resets to zero address until the start of the next radar cycle. Upon command by the radar trigger, obtained from the main "bang," the system automatically starts at zero and cycles all addresses sequentially as explained above.

Upon the start command by the radar trigger, the data stored is called out to the shift register but each bit is logic-guided to the bit address numbered seven higher. This read-shift-write operation performs three basic functions. It first reads the bits at the selected location or bank in the memory (in which there are seven bits, in the example shown) and then shifts the outcoming read information so that each bit moves to a register stage numbered seven higher. Information coming out of bit storage 1 is now stored at 8, bit 2 moves to 9, et cetera, and data bits 64 to 70 will be dissipated in the resistor 19 after read out.

Next, during the write portion of the memory cycle, the receiver loads data register stages 1 through 7 with new data while bits 8 through 70 are shifted. The data in the memories are actually sent to the shift registers 14 and to the input to the D-to-A converters 22 simultaneously. The 70-bit message is grouped into 10 sets or groups of words of seven bits each. The seven stored bits of the memory banks are fed simultaneously to separate digital-to-analog converters, 22.

If the significance of each bit processed in the D-to-A converters 22 remains the same as assigned in the A-to-D converter 10, the output analog voltages will be the same as the sampled voltages taken from the raw signal. These restored voltage values are integrated by the summer 18 and the resultant value is sent to the radar console where their relative values can be visually presented on a cathode-ray tube by varying intensities or varying deflections of the cathode-ray tube beam. The resultant display will have a signal-to-noise ratio improvement of N, where N is the number of samples integrated, which in the illustrated example is 10.

Figure 3:
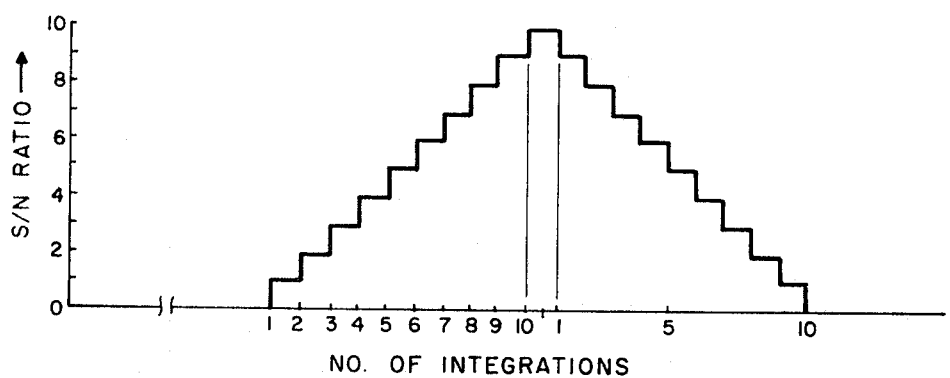
FIG. 3 is a diagram showing the buildup of a wanted signal in the system of FIG. 1.

The sum of a series of samples from noise invariably adds to zero, however, the sum of a series of real signal voltages, although buried deep in noise, add or integrate to a signal level proportional to the length of integration involved. In FIG. 3, for example, the apex of the pyramidal voltage is in the sum of 10 steps obtained from the output of 10 storage addresses.

Obviously many modifications and variations of the present invention are possible in the light of the above teachings. It is therefore to be understood that within the scope of the appended claims the invention may be practiced otherwise than as specifically described.

What is claimed is:

1. The method of deriving reoccurring wanted signals from a background of random noise, said method comprising:
   repeatedly receiving said reoccurring raw signals,
   sampling at spaced time intervals the instantaneous amplitude of a predetermined segment of the signal plus noise voltage,
   converting each sampled voltage to a coded digital number,
   storing the bits of each coded number in a series of storage banks,
   shifting each digital number from the first storage bank to the next and hence successively through each of said series,
   converting the digital content at each bank after each shift to the analog equivalent,
   adding together the analog numbers after each shift, and displaying the resultant summed voltage.

2. The method defined in claim 1 of deriving reoccurring signals further comprising the step of:
   locally generating and transmitting reoccurring radar-type pulses,
   locally generating successive storage address voltages, and
   directing said coded digital numbers to different storage addresses in response to successive trigger pulses from said locally generated radar-type pulses.

3. A system for enhancing the signal-to-noise ratio of reoccurring radar signals comprising:
   means for sampling the received signal at predetermined intervals throughout a predetermined segment of the received signal;
   means for converting the amplitude of each sample to a multiple bit encoded binary number;
   magnetic storage means;
   means for feeding the groups of binary bits of each encoded number of the samples into one portion of said storage means;
   means for shifting the groups of bits progressively to new locations along said storage means;
   means for cyclically summing the numerical value of the numbers of a segment of said storage means, and displaying the summed values; and
   a shift register coupled between adjacent locations along said storage means each register having sufficient stages to accommodate each bit of the encoded binary numbers.

* * * * *